April 15, 1930.    C. M. HIBBETS    1,755,002

CLUTCH PROTECTING DEVICE

Filed May 3, 1927

WITNESSES

INVENTOR
C. M. Hibbets.
BY
ATTORNEYS

Patented Apr. 15, 1930

1,755,002

UNITED STATES PATENT OFFICE

CHARLES M. HIBBETS, OF CLAUDE, TEXAS

CLUTCH-PROTECTING DEVICE

Application filed May 3, 1927. Serial No. 188,491.

The present invention relates generally to clutch mechanism as used on automobiles, and more particularly to a device or attachment designed to protect a clutch mechanism from undue wear and tear on its parts incident to the certain abuses in the operation of the same by a large majority of automobile operators.

The main object of the invention is to provide for a simple, inexpensive but efficient device of the character mentioned, and one capable of being readily and easily installed in position of use on automobiles of all known classes and descriptions which employ a foot pedal for actuating the clutch mechanism of the same.

Another object of the invention is to provide for a device of the nature set forth and one adapted for co-operation with the usual clutch operating pedal of an automobile and in a manner to relieve the clutch and its bearings from all the abuses, causing undue wear and tear, incident to "riding the clutch pedal" practices of automobile operators.

This "riding the clutch pedal" habit of a great number of automobile drivers obtains whenever an operator permits his foot to rest inert or inactive on the clutch actuating pedal while driving, and by varying pressures incident thereto causes the clutch parts to wear unnaturally and quickly, and the invention herein presented aims to effectively eliminate the disadvantages of such a practice.

With the foregoing and other objects and advantages in view the invention resides in the certain new and useful construction and arrangement of parts as will be hereinafter more fully described, set forth in the appended claims, and illustrated in the accompanying drawings, in which:—

Figure 1:
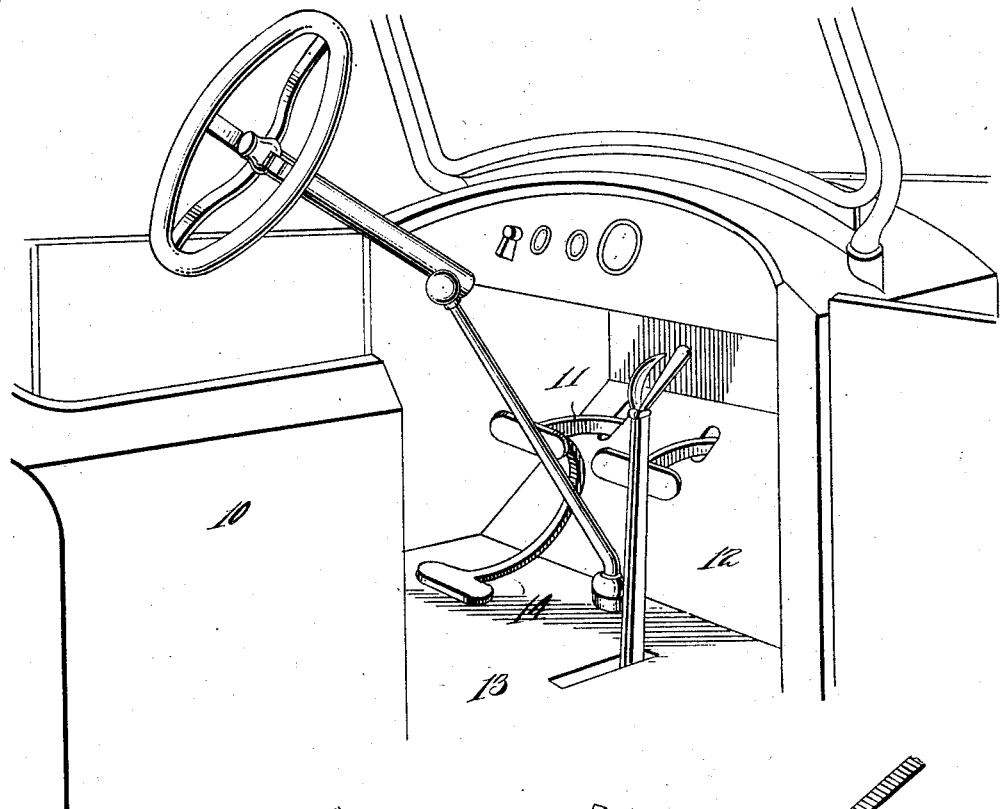
Figure 2:
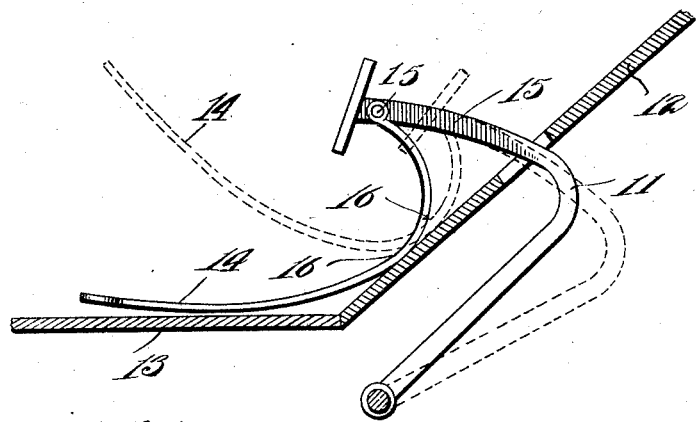

Figure 1 is a fragmentary perspective view of an automobile showing a practical application of the invention, and Figure 2 is a vertical longitudinal section showing the invention in operative connection with the clutch pedal.

Referring to the drawings, and more particularly to Fig. 1 thereof, an automobile is shown, generally indicated at 10, as having a clutch pedal 11 projecting as usual through the forwardly and upwardly inclined portion 12 of the floor board 13, and I have shown an embodiment of my invention as it appears when attached to the clutch pedal 11 for cooperation therewith to accomplish the desired objects and purposes thereof.

The embodiment of the invention as illustrated comprises a foot piece or member 14, hinged or otherwise pivoted at one end, as at 15, to the clutch pedal 11, the point of pivotal connection 15 being preferably just beneath the usual foot rest carried at the free end of the clutch pedal 11. The member 14 is bent on a curved line in a direction downwardly from the point of its pivotal connection 15, to a point of bearing on the inclined portion 12, of the floor board 13, and thence is curved more acutely in a direction rearward from the point of contact with the floor portion 12 for a distance, from whence the curvature is reduced to almost a straight line to the rearwardly disposed free end of the member. This acutely curved portion as at 16, is disposed in rocking or rolling contact with the inclined floor board portion 12 at all times, and, as a consequence of which acts to restrain the foot pedal 11 from all movements other than those incident to the positive and intended operation of the clutch mechanism.

In practice, and after the device has been properly attached to the clutch pedal 11, the operator will place his foot on the foot rest of the clutch pedal in the usual manner, but will rest the heel of his engaged foot on the rearwardly extending flattened or enlarged portion of the member 14, and, if he is "riding the clutch pedal," all foot pressure incident to this practice and other than that actually intended to be exerted on the clutch pedal 11 for the actuation of the clutch mechanism will be counteracted by the support given the pedal 11, by the portion 16 of the member 14 in its contact with the inclined floor board portion 12. Now, when the clutch pedal 11 is forced forwardly under the pressure of the foot of the operator, or released for return to its normal inoperative position, the acutely curved portion 16 of the member 14 will rock or roll on the inclined floor board portion 12, and cause the flattened end or foot rest portion of the member to swing in an upwardly and downwardly direction correspondingly with the forward and rearward movements of the pedal arm 11 so that the heel portion of the active foot of the operator is supported or in contact thereon at all times during the operation of the clutch mechanism. When the pedal arm 11 is in its normal inoperative position, the weight of the foot of the operator on the flattened or enlarged portion of the member 14 further accentuates the restraining influence of the support given to the pedal arm 11 by the pressure exerted on the bearing portion 16 acting on the inclined floor portion 12, all of which not only operates to prevent movement to the clutch arm 11 from foot pressure, due to "riding the clutch pedal," but also tends to prevent undue vibratory movements of the clutch arm incident to the travel of the automobile. This relieving the clutch arm 11 of vibrating movements will also act to eliminate noisy clattering or rattling of the clutch arm as well as to further relieve wear and tear on the same and its bearings.

Without further description it is thought that the features and advantages of the invention will be readily apparent to those skilled in the art, and it will of course be understood that changes in the form, proportion and minor details of construction may be resorted to without departing from the spirit of the invention or its scope as claimed.

Having thus fully described my invention what I claim is:—

1. In combination with the forwardly inclined portion of the floor of an automobile and a clutch pedal operating through the said inclined portion, and a foot piece having pivoted connection with the clutch pedal and adapted to bear against the said inclined portion of the floor board, said foot piece being formed to provide a curved bearing portion and a relatively straight foot engaging portion whereby to cooperate with the foot of the operator and the clutch pedal in a manner to relieve the clutch and its bearings of all foot pressure incident to the otherwise abusive practice of "riding the clutch pedal".

2. In combination with a forwardly inclined portion of the floor of an automobile and a clutch pedal operating through the said inclined portion, and a foot piece having pivoted connection at one end to the clutch pedal, said foot piece member formed to provide an acutely curved portion adjacent its pivoted end and adapted to bear against the inclined portion of the floor board, and a foot engaging portion extending rearwardly from the acutely curved portion, the foot portion being adapted to be engaged by the foot of the operator whenever the foot is rested in operative position on the clutch pedal, said foot piece operating with the clutch pedal in a manner to relieve the clutch and its bearings of all foot pressures incident to the otherwise abusive practice of "riding the clutch pedal".

3. In combination with the forwardly inclined portion of the floor board of an automobile and a clutch pedal operating through the said inclined portion, and a curved foot piece having pivotal connection at one end with the clutch pedal and adapted to bear against the said inclined portion of the floor board, the free end of said foot piece being adapted to be engaged by the foot of the operator when it is operably positioned on the clutch pedal and in a manner to relieve the clutch and its bearings of all foot pressure incident to the otherwise abusive practice of "riding the clutch pedal".

4. In combination with the floor of an automobile and a clutch pedal operating through the floor, a foot piece having pivoted connection with the clutch pedal, and an intermediate portion thereof arranged for rocking support on the floor, the free end of said foot piece being adapted to be engaged by the foot of the operator simultaneously with the placing of the same in an operative position on the clutch pedal, whereby the latter will be sustained against any movements of the foot other than that intended to effect a positive operation of the clutch pedal.

CHARLES M. HIBBETS.